(12) United States Patent
Huang et al.

(10) Patent No.: US 6,721,064 B1
(45) Date of Patent: Apr. 13, 2004

(54) TWO-DOMAIN CHROMA BOOST METHOD FOR COLOR PRINTING

(75) Inventors: Xuan Chao Huang, Lexington, KY (US); Brant Dennis Nystrom, Lexington, KY (US); Richard Lee Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/512,582

(22) Filed: Feb. 24, 2000

(51) Int. Cl.[7] ............................. H04N 1/00; G03F 3/08; G06K 9/00
(52) U.S. Cl. ..................... 358/1.9; 358/518; 358/520; 382/162; 382/164
(58) Field of Search ..................... 358/1.9, 518, 519, 358/520, 521, 522, 538; 382/190, 162, 164, 167, 168; 345/589

(56) References Cited

U.S. PATENT DOCUMENTS

| | | |
|---|---|---|
| 3,816,846 A | 6/1974 | Nero et al. |
| 3,825,673 A | 7/1974 | Schreiner et al. |
| 3,982,273 A | 9/1976 | Cochran |
| 4,689,666 A | 8/1987 | Htanaka |
| 4,754,321 A | 6/1988 | Srivastava |
| 5,130,935 A | 7/1992 | Takiguchi |
| 5,210,600 A | 5/1993 | Hirata |
| 5,296,945 A | 3/1994 | Nishikawa et al. |
| 5,394,518 A | 2/1995 | Friedman et al. |
| 5,528,339 A * | 6/1996 | Buhr et al. .................. 355/32 |
| 5,539,523 A | 7/1996 | Nakai et al. |
| 5,583,666 A | 12/1996 | Ellson et al. |
| 5,715,377 A | 2/1998 | Fukushima et al. |

* cited by examiner

Primary Examiner—Kimberly Williams
Assistant Examiner—Thomas J. Lett
(74) Attorney, Agent, or Firm—Taylor & Aust, P.C.

(57) ABSTRACT

A method of transforming two color domains of an original target color profile in a universal color space includes receiving information characterizing the original target color profile. A non-flesh-tone domain chroma boost curve is constructed. The non-flesh-tone domain chroma boost curve is applied to the original target color profile to generate an intermediate target color profile. A flesh-tone domain boundary in the intermediate target color profile is determined. A flesh-tone domain chroma boost curve is constructed. A new target color profile is established by applying the flesh-tone domain chroma boost curve to the intermediate target color profile.

17 Claims, 3 Drawing Sheets

TWO-DOMAIN CHROMA BOOST METHOD FOR COLOR PRINTING

BACKGROUND OF THE INVENTION

1. Field of the Invention

The present invention relates to a method of boosting chroma for color printing, and, more particularly, to a method of boosting chroma for color printing of an image that includes both flesh-tones and non-flesh-tones.

2. Description of the Related Art

One of the important processes in ink-jet printing is color reproduction. This process includes, among other things, "target" determination and "object" generation. The "target" and "object" are represented by color profiles in which the color value is specified for each colorant (device value) combination of red, green and blue (RGB) or cyan, magenta, yellow and black (CMYK). The color profile to be reproduced is the target, whereas the color profile on which the color reproduction occurs is the object. For example, the computer monitor profile can be considered the "target" and the printer profile can be considered the "object". With the target and object, it can be determined which printer colorant combination (CMYK) is required for a given monitor colorant combination (RGB) in order to reproduce the target color on the object. Changing the target results in a change in the printer output.

The well-known target of the computer monitor is the computer monitor model. Since the set of all colors that can be produced, known as a "gamut," of this monitor target is much different from the printer gamut, some mapping must be done between the two kinds of gamut. The mapping is typically carried out in an intermediate color space, such as CIELAB, wherein any color value can be expressed in a standard format. In CIELAB color space, luminance (brightness), hue (color) and chroma (saturation) are specified by three-dimensional coordinates ($L^*$, $a^*$, $b^*$). CIE stands for Commission Internationale de l'Eclairage, an international body of color scientists. $L^*$ describes relative lightness; $a^*$ represents relative redness-greenness, and $b^*$ represents relative yellowness-blueness. Luminance is specified by the $L^*$ value of the point of interest; hue is specified by the angle that is the arc tan of $b^*/a^*$; and chroma is specified by the distance of the point of interest from the $L^*$ axis, which can be calculated from the formula $[(a^*)^2+(b^*)^2]^{1/2}$.

The mapping can generally give acceptable results for most cases but does not always yield desired outputs. For example, the surround of a picture of a human in a photo image reproduced on an ink jet printer may not be vivid enough. However, if the chroma is boosted to make the surround more colorful, the flesh-tones, or skin-tones, of the human picture become unrealistically vivid.

What is needed in the art is a method of smoothly transforming two color domains, such as flesh-tones and non-flesh-tones, in different ways so as to make the surround in a human picture more colorful without making the skin-tones of the human picture unrealistically vivid.

SUMMARY OF THE INVENTION

The present invention provides a method of making the non-flesh-tone domain of photo images more vivid while changing the flesh-tone domain to the desired colors.

The invention comprises, in one form thereof, a method of transforming two color domains of an original target color profile in a universal color space. Information characterizing the original target color profile is received. A non-flesh-tone domain chroma boost curve is constructed. The non-flesh-tone domain chroma boost curve is applied to the original target color profile to generate an intermediate target color profile. A flesh-tone domain boundary in the intermediate target color profile is determined. A flesh-tone domain chroma boost curve is constructed. A new target color profile is established by applying the flesh-tone domain chroma boost curve to the intermediate target color profile.

An advantage of the present invention is that the chroma surrounding human skin tones in an image can be boosted without boosting the skin tones to a degree that the skin appears unrealistically vivid.

Another advantage is that a transition between the two domains is smooth and produces no artifacts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The present invention includes a method of boosting the chroma of an image that includes human skin tones in order to make the surroundings of the skin more vivid. A practical problem is that when the chroma is boosted to make the surround more colorful, the flesh-tone (skin tone) of the human picture itself becomes very unrealistically vivid. The present invention solves this problem by boosting the two domains' chromas in different ways.

Figure 1:
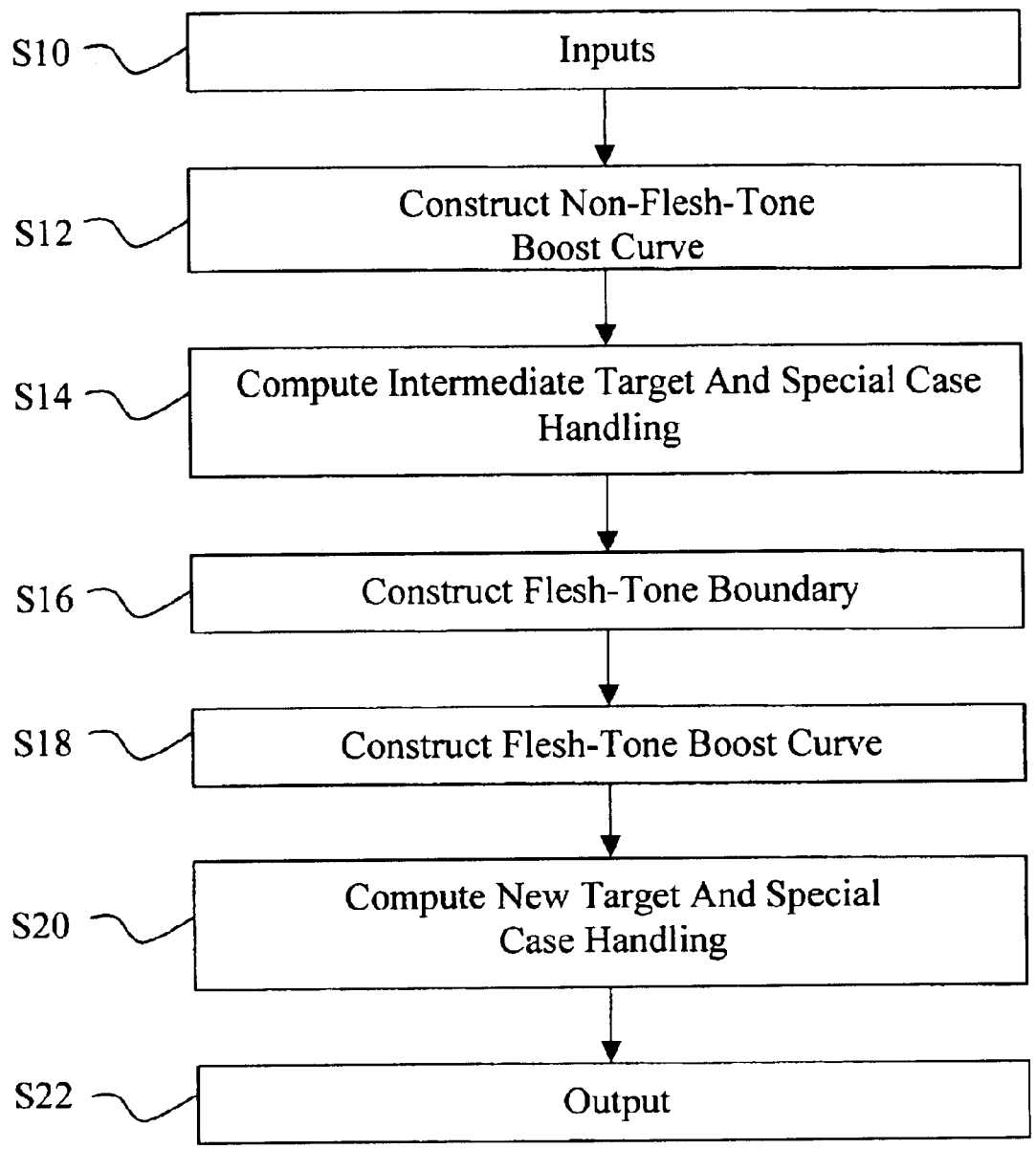
FIG. 1 is a flow chart of one embodiment of the method of the present invention.

A flow chart (FIG. 1) provides an overview of one embodiment of the method of the present invention. The method includes flesh-tone data collection (step S10), flesh-tone domain boundary construction (step S16), and boost curve construction (steps S12 and S18). The inputs collected in step S10 include the original target, collected flesh-tone data, non-flesh-tone boost level ($B_n$) (or customized non-flesh-tone boost look-up table), flesh-tone boost level ($B_f$) (or flesh-tone ellipse center boost look-up table and flesh-tone boost curve for a flesh-tone ellipse), and minimum and maximum continuously increasing ratios specified as angles. The original target is first boosted for all domains by the non-flesh-tone boost level ($B_n$) to obtain a smooth intermediate target (step S14). Based on the intermediate target and the collected flesh-tone data, a smoothed flesh-tone domain boundary is constructed (step S16). Then, the flesh-tone domain is boosted by a level of ($B_f-B_n$) (step S20). The final output (step S22) is a new target.

The method outlined above is now discussed in more detail. The flesh-tone RGB values are collected from various human flesh-tone images. At least 100 pixels are measured. The RGB values are then converted to CIELAB values by using a computer monitor model. These CIELAB values ($L^*$, $a^*$, $b^*$) form a flesh-tone domain in the CIELAB color space.

Figure 2:
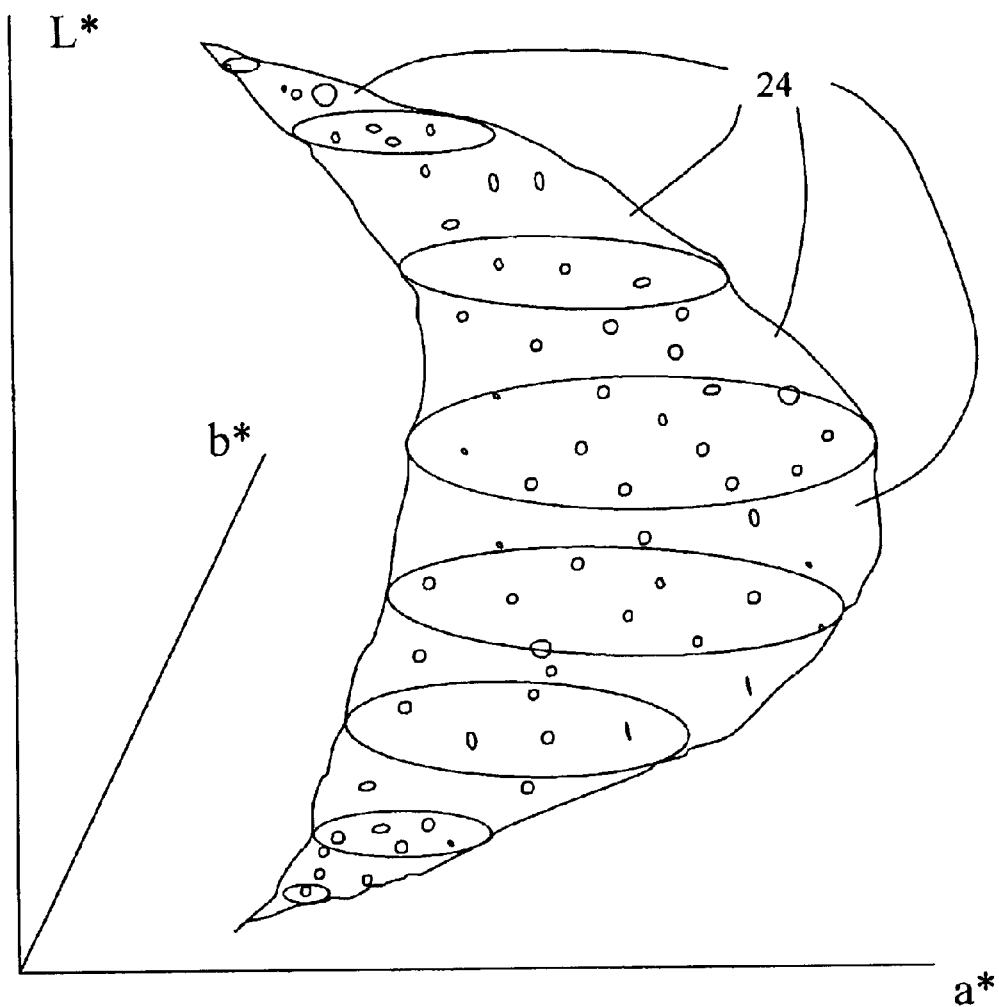
FIG. 2 is a three-dimensional plot of a flesh-tone domain boundary constructed in the method of FIG. 1.

The flesh-tone domain is then used to construct a three-dimensional flesh-tone boundary (FIG. 2). When determining the flesh-tone domain boundary, the collected flesh-tone data do not normally cover the entire actual flesh-tone domain that is illustrated in FIG. 2. The constructed flesh-tone boundary is constructed to be smooth in the three-dimensional space.

Figure 3:
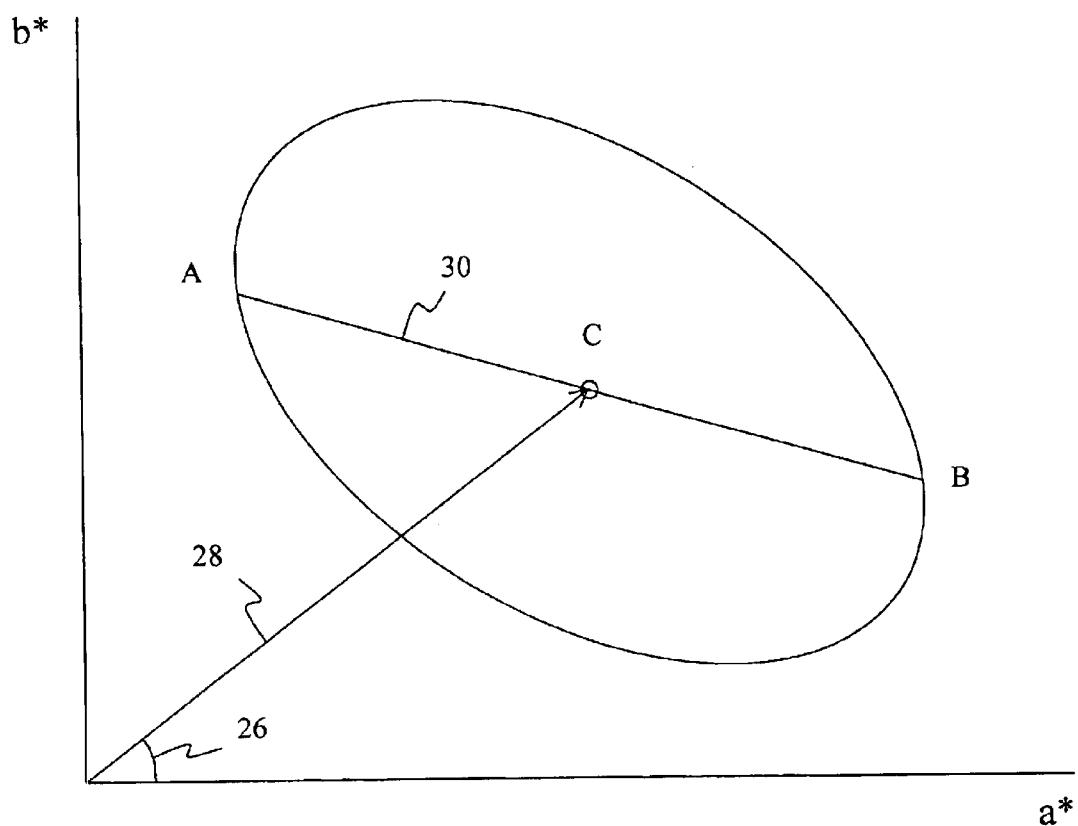
FIG. 3 is a plot of one of the ellipses of FIG. 2 projected onto the $a^*-b^*$ axis.

The flesh-tone domain is divided into several sub-domains 24 along the $L^*$ axis, with each sub-domain 24 equaling approximately 10% of the target $L^*$ dynamic range. Next, all $a^*$ and $b^*$ values in a selected sub-domain 24 are projected onto the $a^*$–$b^*$ plane in the CIELAB space. In FIG. 3, the boundary points of the flesh-tone plane are fitted into an ellipse. If there are not enough points to fit into an ellipse, points are added from the nearest neighboring sub-domains 24. Determined for each ellipse are its semimajor axis, semiminor axis, orientation angle of the major axis, the ellipse center's chroma (the distance from ellipse center C to the $L^*$ axis), and the ellipse center's hue (angle 26 between center vector 28 and the $a^*$ axis in the $a^*$–$b^*$ plane). Thus, a total of five parameters are determined. Each of these five elliptical parameters varies along the $L^*$ axis.

The $L^*$ axis can be considered as the x-axis of the x-y Cartesian coordinate system and each of the five elliptical parameters as the variable on the y-axis. Since each of these five elliptical parameters changes along the $L^*$ axis, the (x, y) points can be fitted into a four-degree (five items) polynomial. A total of five polynomials are fitted. Then, the five elliptical parameters are re-fitted from the five fitted polynomials for any given value of $L^*$. The reason for doing the fitting is that when the change of each of the five parameters along the $L^*$ axis is smooth, all the ellipses smoothly change along the $L^*$ axis. Thus, the flesh-tone boundary is smooth in the three-dimensional color space.

As indicated above, the flesh-tone domain changes along the $L^*$ axis. Ideally, the flesh-tone ellipse should converge to a point at either of the two ends of the flesh-tone domain boundary. That is, the semi-major and semi-minor axes of an ellipse should be zero at the two ends within the target's $L^*$ dynamic range. This may, however, not always be the case due to the noise from the flesh-tone data collection. The non-convergent case is made to converge in two steps. First, the flesh-tone ellipse axes are set to zero at either end along the $L^*$ axis. The end (top or bottom) is set one step (10% of the target's $L^*$ dynamic range) beyond the maximum or minimum measured flesh-tone $L^*$, but not outside the target $L^*$ range. Second, the converged portion of the ellipse axes is smoothed using cubic-spline interpolation and a running average.

In the two-domain chroma boost, the inputs include the boost level for non-flesh-tone domain ($B_n$ in percentage), and the boost level for flesh-tone domain ($B_f$ in percentage). The chroma boost procedure for the two different domains is carried out by first boosting all chromas of all domains by the non-flesh-tone level ($B_n$), and then boosting the flesh-tone domain by a level of ($B_f - B_n$). Thus, if $B_n$ equals $B_f$, the two domains are boosted by the same level and no special boost is conducted for the flesh-tone domain. This is the case of the "traditional" chroma boost.

For a given input target, the minimum and maximum chromas remain the same after the boost, and at chroma values that are at 50% of the dynamic chroma range, the chroma is boosted by the full amount of $B_n$ (%). For all other input chroma values, the boost level varies in a smooth way. Equation (1) below represents one simple equation for output chroma:

$$y = A_1 + B_1 x + C_1 x^2 \qquad \text{Equation (1):}$$

wherein x is the normalized input chroma and y is the normalized output chroma. The normalization is necessary for better understanding and also for simplicity in constructing the boost curve, especially for the flesh-tone boost curve construction. The normalization is carried out by use of Equation (2), as follows:

$$x = 100(z - z_{min})/(z_{max} - z_{min}) \qquad \text{Equation (2):}$$

wherein z is the non-normalized chroma, and $z_{min}$ and $z_{max}$ are the minimum and maximum non-normalized chromas of the target, respectively ($z_{min}$ should be zero in CIELAB space). The parameters $A_1$, $B_1$, and $C_1$ in Equation (1) are constants which can be solved given the three conditions (with Equation (2), xmin=0, $x_{max}$=100) of Equations (3), (4) and (5) as follows:

$$\text{when } x = x_{min}, y = x_{min}; \qquad \text{Equation (3):}$$

$$\text{when } x = 0.5(x_{max} - x_{min}), y = 0.5(x_{max} - x_{min})(1 + B_n/100); \text{ and}$$
$$\qquad \text{Equation (4):}$$

$$\text{when } x = x_{max}, y = x_{max}; \qquad \text{Equation (5):}$$

For any non-normalized input chroma (z), its boosted value ($z_b$) is calculated by Equation (6), as follows:

$$Z_b = z(y/x) \ (Z_b = z \text{ if } x = 0) \qquad \text{Equation (6):}$$

Alternatively, the user can input a customized curve (look-up table) to replace Equation (1). The customized curve is required to include paired values of (x, y), each ranging from 0 to 100. At least 10 points are specified. The input points are interpolated for unspecified points using the cubic-spline interpolation technique.

As discussed above, a flesh-tone ellipse, perpendicular to the $L^*$ axis, can be determined for any $L^*$ value in the flesh-tone domain. When conducting the flesh-tone boost, only the points within the ellipse are boosted and all other points (on the plane containing the ellipse) lying on or outside the ellipse boundary are unchanged by the boost. That is, the intermediate target color profile generated by the non-flesh-tone boost curve is unchanged by the flesh-tone curve outside the flesh-tone domain boundary.

The amount by which the ellipse center is boosted depends upon but is not necessarily equal to the level of ($B_f - B_n$). Since the center of the flesh-tone ellipse varies along the $L^*$ axis, if all of the ellipse centers were boosted by the same percentage, different flesh-tone chromas might get the same boost level. This could cause unsmoothed boost in the color space and would not be consistent with the way by which the non-flesh-tone boost level is specified. Thus, the following method is used to determine the ellipse center boost level ($B_{fc}$).

In a similar way to the non-flesh-tone boost, the flesh-tone chroma is boosted by a level of ($B_f - B_n$) at the chroma values that are at 50% of the target's dynamic chroma range. The following Equation (7) is used to determine the flesh-tone ellipse center boost level:

$$y = A_2 + B_2 x + C_2 x^2 \qquad \text{Equation (7):}$$

By replacing $B_n$ in Equation (4) with $(B_f-B_n)$ and again using Equations (3) and (5), the values of the constants $A_2$, $B_2$, and $C_2$ can be determined. The ellipse center's normalized output $y_c$ can be calculated from Equation (7).

The ellipse center boost level is given by Equation (8), as follows:

$$B_{fc}=100(y_c-x_c)/x_c \qquad \text{Equation (8):}$$

wherein $x_c$ is the ellipse center's normalized chroma before the flesh-tone curve is applied.

The user can also input a customized curve (look-up table) to replace Equation (7) in a similar way to the customized non-flesh-tone boost curve.

For any point in a flesh-tone ellipse, a line 30 can be drawn through this point and the ellipse center (point C in FIG. 3). Line 30 intersects the ellipse boundary at two points A and B. The flesh-tone boost curve (Equation (9) below), corresponding to $(B_f-B_n)$, for any points between A and B is constructed as follows:

$$y=A_2+B_2x+C_2x^2+D_2x^3+E_2x^4 \qquad \text{Equation (9):}$$

wherein y is the normalized output chroma of a point under consideration between A and B, and the x value of the point is defined as below in Equations (10) and (11):

$$x=x_c-s \text{ if the point's normalized chroma}<=x_c \qquad \text{Equation (10):}$$

and $$x=x_c+s \text{ if the point's normalized chroma}>x_c \qquad \text{Equation (11):}$$

wherein $x_c$ is the ellipse center's normalized chroma, and s is the normalized distance between the point under consideration and the ellipse center C.

The five constants $A_2$, $B_2$, $C_2$, $D_2$, and $E_2$ can be solved given the five conditions as represented in Equations (12), (13), (14), (15) and (16), as follows:

At point A, $y_A=x_A$ (output=input)     Equation (12):

At point A, $dy/dx=1.0$ (first derivative)     Equation (13):

At point C, $y_c=x_c(1+B_{fc}/100)$     Equation (14):

At point B, $y_B=x_B$ (output=input)     Equation (15)

At point B, $dy/dx=1.0$ (first derivative)     Equation (16):

The constructed curve should not have multi-peaks in the input range. However, if the flesh-tone ellipse is too small, the multi-peaks may exist. In this case, cubic-spline interpolation and a running average method can be used in software to determine the boost curve (look-up table) based upon the ellipse center's boost level (Equation (8)) and the flesh-tone boundary conditions (Equations (12) and (15)).

After the flesh-tone boost curve has been constructed, the boosted value ($z_b$) can be calculated by use of Equation (6) for any non-normalized input chroma (z) in the flesh-tone domain.

Alternatively, the user can also input a customized flesh-tone boost curve (look-up table) to replace Equation (9) in a similar way as for the customized non-flesh-tone boost curve. In the case of the flesh-tone boost curve, however, the customized curve must be linearly scaled for each ellipse line (ACB as shown in FIG. 3). In performing the scaling, the lowest input point is scaled to the smaller-chroma point A (output=input). Next, the highest input point is scaled to the higher-chroma point B (output=input). Finally, the middle input point is scaled to the ellipse center C (the actual ellipse center boost level is calculated by Equation (8)).

When chroma is boosted, one criterion is that the boosted chroma increases with the input. Mathematically, Equations (1), (7), and (9) should be continuously increasing functions within the input range. However, this criterion may not hold due to the boost level being too high. To meet the criterion, the following special case handling procedure is employed: First, the user is required to input two parameters: minimum and maximum continuously increasing ratios specified as an angle (the output is equal to the input if the angle is 45 degrees). Second, after the boost, the output is compared to the input at each of the hue angles to set the chroma-increasing ratio to the specified range. In the modification, the priority of preserving the boosted value is given to the flesh-tone ellipse center. Since the boosted target is smooth in any neighborhoods such a modified target remains smooth.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of transforming two color domains of an original target color profile in a universal color space, comprising the steps of:

receiving information characterizing said original target color profile;

constructing a non-flesh-tone domain chroma boost curve;

applying said non-flesh-tone domain chroma boost curve to said original target color profile to generate an intermediate target color profile;

determining a flesh-tone domain boundary in said intermediate target color profile;

constructing a flesh-tone domain chroma boost curve; and establishing a new target color profile by applying said flesh-tone domain chroma boost curve to said intermediate target color profile.

2. The method of claim 1, wherein said flesh-tone domain chroma boost curve is applied only to values of said intermediate target color profile that are within said flesh-tone domain boundary.

3. The method of claim 1, wherein said original target color profile has chroma values ranging from a minimum original chroma value to a maximum original chroma value, said intermediate target color profile being approximately equal to said original target color profile at each of said minimum original chroma value and said maximum original chroma value.

4. The method of claim 1, wherein said flesh-tone domain boundary has chroma values ranging from a minimum flesh-tone chroma value to a maximum flesh-tone chroma value, said intermediate target color profile being substantially unchanged by said flesh-tone domain boost curve at each of said minimum flesh-tone chroma value and said maximum flesh-tone chroma value.

5. The method of claim 4, wherein said intermediate target color profile is substantially unchanged by said flesh-tone domain boost curve at color points outside the flesh-tone domain boundary.

6. The method of claim 1, comprising the further step of collecting flesh-tone data from said original target color profile, said determining step being based upon said flesh-tone data.

7. The method of claim 6, wherein said determining step is also based upon said intermediate target color profile.

8. The method of claim 6, wherein said collecting step includes measuring at least 100 pixels corresponding to said original target color profile.

9. The method of claim 6, wherein said flesh-tone data comprises RGB values.

10. The method of claim 9, wherein said RGB values are converted to CIELAB values by using a computer monitor model.

11. The method of claim 1, wherein said flesh-tone domain boundary is smooth in a three-dimensional space.

12. The method of claim 1, wherein said non-flesh-tone domain chroma boost curve provides a first plurality of boost values as a function of chroma, said flesh-tone domain chroma boost curve providing a second plurality of boost values as a function of chroma.

13. The method of claim 1, wherein said non-flesh-tone domain chroma boost curve is dependent upon a non-flesh-tone boost level ($B_n$).

14. The method of claim 13, wherein said flesh-tone domain chroma boost curve is dependent upon a flesh-tone boost level ($B_f$).

15. A method of transforming two color domains of an original target color profile in a universal color space, comprising the steps of:
   receiving information characterizing said original target color profile;
   constructing a first chroma boost curve;
   applying said first chroma boost curve to said original target color profile to generate an intermediate target color profile;
   constructing a second chroma boost curve; and
   establishing a new target color profile by applying said second chroma boost curve to a selected portion of said intermediate target color profile.

16. The method of claim 15, wherein said first chroma boost curve comprises a non-flesh-tone domain chroma boost curve, said second chroma boost curve comprising a flesh-tone domain chroma boost curve.

17. The method of claim 16, wherein said selected portion of said intermediate target color profile comprises a portion of said intermediate target color profile that is within a flesh-tone domain boundary.

* * * * *